UNITED STATES PATENT OFFICE.

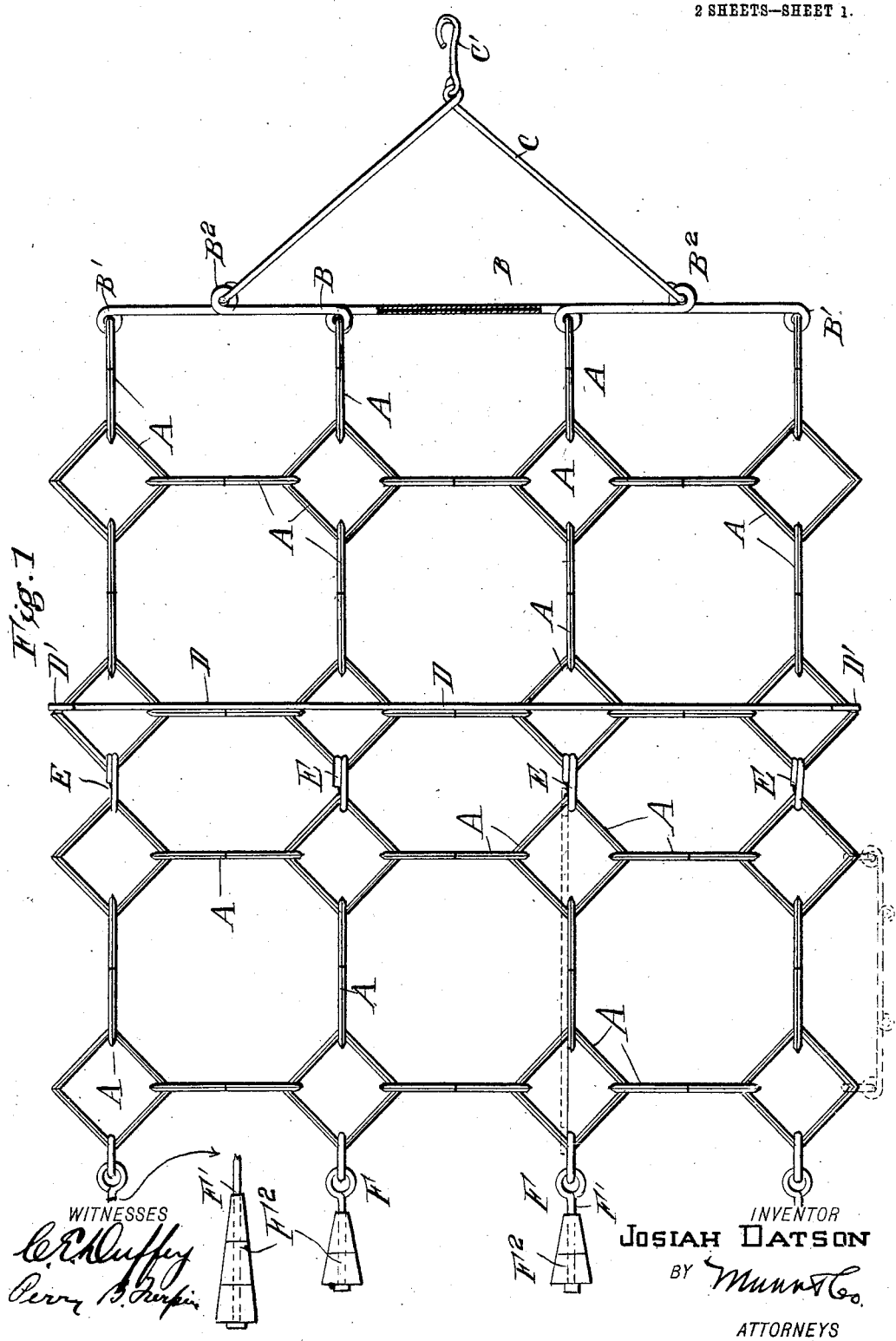

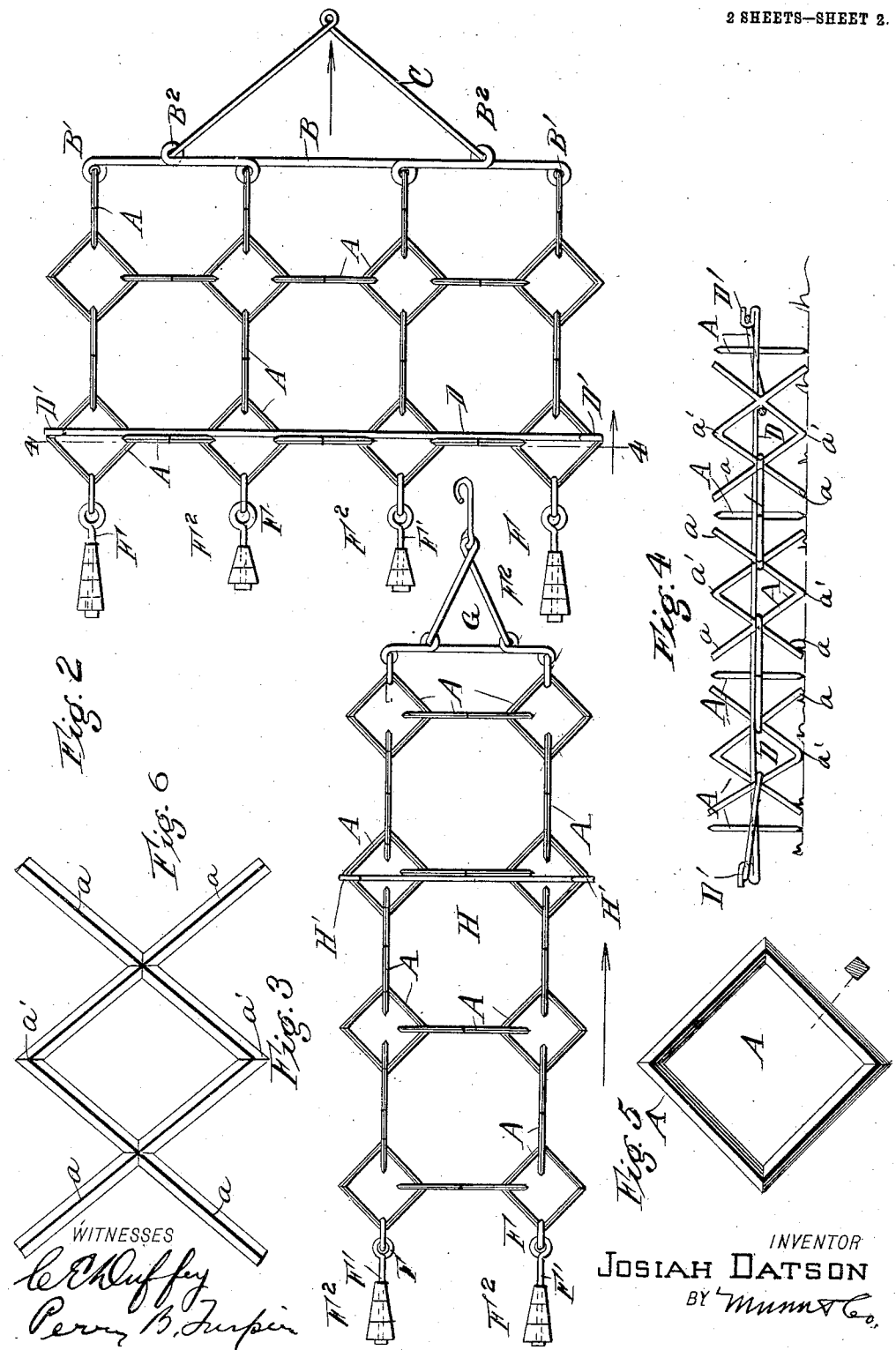

JOSIAH DATSON, OF GILBERTS CREEK, KENTUCKY.

CHAIN-HARROW.

No. 869,065.      Specification of Letters Patent.      Patented Oct. 22, 1907.

Application filed February 1, 1907. Serial No. 355,180.

*To all whom it may concern:*

Be it known that I, JOSIAH DATSON, a citizen of the United States, and a resident of Gilberts Creek, in the county of Lincoln and State of Kentucky, have invented certain new and useful Improvements in Chain-Harrows, of which the following is a specification.

My invention is an improvement in harrows, and consists in certain novel constructions and combinations of parts as will be hereinafter described and claimed.

In the drawings Figure 1 is a top plan view of a harrow embodying my invention. Fig. 2 is a top plan view showing the front harrow section alone. Fig. 3 is a top plan view showing the rear harrow section alone. Fig. 4 is a cross-section of a harrow showing a somewhat different form of vertical link from that shown in Figs. 1 and 2. Fig. 5 illustrates in detail one of the horizontal links, and Fig. 6 illustrates in detail one of the vertical links shown in Fig. 4.

In carrying out my invention, I seek to provide a harrow composed of links A which may be alike and are linked together longitudinally and laterally forming longitudinal and lateral rows, and in which the alternate links of the longitudinal rows are connected by cross links with the opposite links of the adjacent rows so that these alternate links are held approximately in a horizontal plane so that the links connecting said alternate links will be caused to operate vertically, and thus form runners to cut open the soil and clods in such manner as to properly prepare the same in the use of the invention.

By preference, the links A are rectangular and are formed of metal bars which are angular in cross-section with the angle at their outer sides as best shown in Fig. 5 of the drawings, and turned on the sharp corner of the iron to present an approximately sharp edge to split the ground and break up clods in the use of the invention, this being especially effective when the alternate links are caused to run vertically as before described.

The draft bar B extends across the front of the harrow and is preferably formed of iron piping, see Fig. 1, and is coiled at intervals at B′ for connection with the front links A of the longitudinal rows and with coils B² for the connection of the bar C, and the bar C may be provided with a suitable hook C′ for connection with the team.

By preference the vertical links are as shown in Figs. 4 and 6 provided with the projecting points $a$ whose ends together with the points or angles $a'$, form the three points which may serve to improve the action of the harrow and form three teeth at each side of the drag square. This construction as best shown in Fig. 6 presents an appearance somewhat similar to the well known square and compass.

For extending the harrow laterally I provide a spreader bar D extending transversely, as shown in Fig. 1, and provided at its ends with hooks D′, as best shown in Fig. 4, for holding the harrow stretched laterally. By means of these hooks the stretcher bar can be readily removed and applied whenever desired.

As shown, I prefer to make the harrow in two sections, with the front section detachably connected with the rear section by means of devices which may be split rings E, as shown in Fig. 1, and drags F are arranged at the rear end of the harrow and comprise bars F′ and suitable weights or blocks F² thereon.

The harrow, as shown in Fig. 1, forms a useful two horse harrow. When it is desired to provide one or two one-horse harrows, the rear section of the harrow, shown in Fig. 1 may be detached, and suitable draft devices G connected with the side links as shown in Fig. 3 and as indicated in dotted lines in Fig. 1, the drags being connected with the rear links, as shown in Fig. 3, and a short spreader bar H hooked at its ends H′ may be provided as shown in said Fig. 3. The front section may also be utilized as a one-horse harrow, as shown in Fig. 2 of the drawings.

The construction is simple, durable, can be easily and cheaply manufactured, and will be found to operate efficiently for the purpose for which it is designed.

I claim:—

1. A chain harrow composed of links linked together longitudinally and links connecting the alternate links of each longitudinal row with the opposite links of the adjacent row the said links being connected together in planes relatively at right angles one to the other whereby the links of the longitudinal rows between said alternate links will be caused to operate vertically, the harrow being formed in front and rear sections detachably connected, drag bars at the rear of the longitudinal rows, a draft bar at the front ends of said rows, and a spreader extending transversely across the harrow and hooked at its ends to engage therewith, substantially as set forth.

2. A harrow comprising links arranged vertically edgewise and having the intermediate point and projecting bars on opposite sides thereof and whose free ends form with the point coöperating teeth, substantially as set forth.

3. In a chain harrow an angular link of metal angular in cross section and having sharp corners with the angles at its outer side, substantially as set forth.

JOSIAH DATSON.

Witnesses:
JAMES I. WHITE,
J. W. HUBER.